United States Patent [19]

Cedros et al.

[11] Patent Number: 5,721,955
[45] Date of Patent: Feb. 24, 1998

[54] SYSTEM FOR TRANSFERRING PORTION OF DATA TO HOST FROM BUFFER IF SIZE OF PACKET IS GREATER THAN FIRST THRESHOLD VALUE BUT LESS THAN SECOND THRESHOLD VALUE

[75] Inventors: Craig Cedros, Beaverton; Nelson Yaple, Aloha; Dave Chalupsky; Phil Martin, both of Banks, all of Oreg.

[73] Assignee: Intel Corporation, Santa Clara, Calif.

[21] Appl. No.: 603,686

[22] Filed: Feb. 20, 1996

Related U.S. Application Data

[63] Continuation of Ser. No. 130,024, Sep. 30, 1993, abandoned.

[51] Int. Cl.$^6$ .............................. G06F 13/14; G06F 13/28
[52] U.S. Cl. ...................... 395/853; 395/868; 395/872; 395/445; 395/854
[58] Field of Search ........................... 395/853, 854, 395/868, 200.14, 872, 445

[56] References Cited

U.S. PATENT DOCUMENTS

| | | | |
|---|---|---|---|
| 3,742,457 | 6/1973 | Calle et al. | 340/172.5 |
| 3,811,114 | 5/1974 | Lemay et al. | 340/172.5 |
| 4,945,548 | 7/1990 | Iannarone et al. | 375/4 |
| 4,947,366 | 8/1990 | Johnson | 364/900 |
| 5,023,829 | 6/1991 | Shibata | 364/900 |
| 5,031,179 | 7/1991 | Yoshida et al. | 371/32 |
| 5,121,479 | 6/1992 | O'Brien | 395/250 |
| 5,247,618 | 9/1993 | Davis et al. | 395/275 |
| 5,249,271 | 9/1993 | Hopkinson et al. | 395/250 |
| 5,303,302 | 4/1994 | Burrows | 380/49 |
| 5,319,752 | 6/1994 | Petersen et al. | 395/250 |
| 5,388,013 | 2/1995 | Nakamura | 360/48 |
| 5,396,597 | 3/1995 | Bodin et al. | 395/275 |

FOREIGN PATENT DOCUMENTS

| | | |
|---|---|---|
| 0247317 | 3/1987 | European Pat. Off. |
| 2256295 | 5/1992 | United Kingdom. |

*Primary Examiner*—Thomas C. Lee
*Assistant Examiner*—Rehana Perveen
*Attorney, Agent, or Firm*—Blakely, Sokoloff, Taylor & Zafman

[57] ABSTRACT

A method and apparatus to optimize buffer memory management in a computer system communications resource. The present invention decreases the time for receiving data from and transmitting data to a network by providing for receipt and transmittal of a data packet, prior to the data packet being in a communications resource buffer memory. Consequently, data spends less time in the communications resource buffer memory. This allows a communications resource to handle more data without increasing the size of its buffer memory and to increase the effective data transfer rate. The present invention provides a means for: 1) starting the transmission of data into the network before all data has been transferred to buffer memory in the communications resource, 2) beginning the transfer of data from the buffer memory of the communications resource before the complete data packet has been received and stored in buffer memory, and 3) error checking to insure data integrity.

4 Claims, 7 Drawing Sheets

FIGURE 5B (EARLY RECEIVE TIMING)

FIGURE 6A (PRIOR ART)

FIGURE 6B (EARLY TRANSMIT TIMING)

SYSTEM FOR TRANSFERRING PORTION OF DATA TO HOST FROM BUFFER IF SIZE OF PACKET IS GREATER THAN FIRST THRESHOLD VALUE BUT LESS THAN SECOND THRESHOLD VALUE

This is a continuation of application Ser. No. 08/130,024, filed Sep. 30, 1993, now abandoned.

BACKGROUND OF THE INVENTION

1. Field of the Invention

The present invention relates to the field of the networking of computer systems, in particular, buffer management between a host processor and a network adapter.

2. Prior Art

Local Area Networks (LANs) have been developed for interconnecting various data terminal equipment (DTE) such as computers, workstations and the like (hereinafter collectively referred to as workstations). One common type of LAN utilizes a shared communication channel, with access to the common channel being coordinated by the workstations themselves. This form of access control is known as Carrier Sense Multiple Access with Collision Detection (CSMA/CD). CSMA/CD access control is described in a number of publications including, for example, Tanenbaum, A. S., *Computer Networks*, second edition, Prentice-Hall, Inc., 1988 at pages 128–130 and also at Meijer, A., and Peeters, P., *Computer Network Architectures*, Computer Science Press, 1983 at pages 280–283. The Institute of Electrical and Electronics Engineers (IEEE) has provided a standard for CSMA/CD which is known as the IEEE 802.3 standard. Well known implementations of CSMA/CD include Ethernet®, DECnet and StarLan.

In general, CSMA/CD may be described as follows: a workstation wishing to transmit on the common channel first monitors the channel to determine whether another workstation is using the channel. If the channel is busy, as indicated by the presence of a carrier on the channel, the workstations wishing to transmit will defer transmission. This may be thought of as the carrier sense portion of the protocol. If the channel is not busy, the workstations will transmit a data packet over the channel, with the packet containing an address of the intended recipient. If a workstation detects the channel is busy or if the workstation detects that a collision has occurred on the channel, the workstation will back-off for a period of time and then again sense the channel to determine if the channel is busy.

In order to participate in the LAN environment, the workstation must have an adapter. The adapter provides the physical and logical interface functions between the LAN and the host processor. The adapter typically resides on the bus structure of the workstation. During the transfer of data to and from the network, the data is temporarily stored on memory associated with the adapter, e.g. via a FIFO or a buffer. In a FIFO implementation, FIFO queues for both transmitting into the network and receiving from the network must be maintained. The FIFO's are typically on-chip with the primary adapter logic. While sufficient for environments with limited network traffic, such FIFO management may degrade system performance under periods of heavy load.

In a buffered scheme, the memory may be off-chip to the adapter logic chip. Moreover, the size of the buffer may be greater than in the FIFO approach. For light loads, the FIFO management scheme may have performance benefits. But as noted above, during periods of heavy load, the buffer memory is a more desirable approach.

In known systems, transmission and receipt of data requires that an entire data packet be in memory prior to it being received by a host processor or transmitted into the network. This may introduce significant delays into both the operation of the workstations and the network. It is an object of the present invention to reduce any delay introduced by the requirement of having an entire packet in buffer memory.

SUMMARY

A method and apparatus to optimize buffer memory management in a computer system communications resource is disclosed. The present invention decreases the elapsed time needed for receiving data from and transmitting data to the network. Consequently, data spends less time in the communication resource buffer memory. This allows a communications resource to handle more data without increasing the size of its buffer memory and to increase the effective data transfer rate.

Communications resources with buffer memory require that groups of data (called packets) be completely copied to the resource before starting transmits and completely received from the communications network before starting to copy data from the resource. The present invention provides a means for:

1) Starting the transmission of data into the network before all data has been transferred to buffer memory in the communications resource.

2) Beginning the transfer of data from the buffer memory of the communications resource before the complete data packet has been received and stored in buffer memory.

3) Error checking to insure data integrity.

With respect to data transmission, the host computer transfers an initial portion of data to the communications resource. Thereafter, a transmit command is issued which initiates the transmission of data into the network. A second transfer is initiated by the host computer to complete the transfer of data to the communication resource. The data is stored in a transmit buffer coupled to the communications resource.

The resource monitors the transfer process versus the transmit process to ensure that the correct data is available for transmit. If the transmit process tries to send data that has not yet been transferred and stored in the resource transmit buffer, the resource aborts the transmit process and sets a flag to indicate to the host computer that the error has occurred. The host computer may then initiate a re-transmission of the data With respect to receipt of the data from the network the host computer calculates and writes a threshold value to the communications resource. This threshold is used by the communications resource to indicate when, during the reception of a packet, the resource will interrupt the host computer to indicate that a packet is currently being received. The host computer then may copy all or some of the data that has been received. After examining the data to determine the size of the incoming data packet, the host may then wait to copy data until the entire packet is received (in the case of a small packet) or calculate a new threshold value which it writes to the resource (in the case of a large packet). The resource will generate a second interrupt to the host computer when this second threshold is reached. The host computer then begins the process of finishing the copy of the remaining data from the resource. The communications resource will monitor the receipt process to determine that the data received by the host computer is valid. If it is not, a flag is set to indicate to the host computer that an error has occurred. If an error has occurred, the host computer may initiate a retransfer of the data from the communications resource. Data incoming from the network is stored in a receive buffer coupled to the communications resource.

The communications resource may typically be implemented as a Local Area Network (LAN) Adapter for a computer system, a node for a multi-processor computer system or any other system in which processing systems are in communication.

DETAILED DESCRIPTION OF THE PREFERRED EMBODIMENT

A method and apparatus for optimization of buffer memory management in a communications resource is described. In the following description, numerous specific details are set forth such as the timing of data signals in order to provide a thorough understanding of the present invention. It will be apparent, however, to one skilled in the art that the present invention may be practiced without such specific details. In other instances, specific implementation details such as the physical interface to the Local Area Network (LAN) media or a CPU bus have not been shown in detail in order not to unnecessarily obscure the present invention.

While the communications resource of the currently preferred embodiment of the present invention is implemented as a LAN interface adapter supported by a general purpose computer, it would be apparent to one skilled in the art to embody the present invention in a fixed function system, e.g. an X-Terminal. Further, the present invention may be embodied as an adapter to couple to a computer system into any type of environment where processing systems are in communication, e.g. a parallel processing system. Such embodiments would not depart from the spirit and scope of the present invention.

The computer system 100 of the currently preferred embodiment is described with reference to FIG. 1. A computer system as may be utilized by the preferred embodiment generally comprises a bus structure or other communication means 101 for communicating information between the various components of the computer system, a processor means 102 coupled with said bus 101 for processing information, a random access memory (RAM) or other storage device 103 (commonly referred to as a main memory) coupled with said bus 101 for storing information and instructions for said processor 102, a read only memory (ROM) or other static storage device 104 coupled with said bus 101 for storing static information and instructions for said processor 102, a display monitor 105 is coupled with said bus 101 for communication with the processor 102, a data storage device 106, such as a magnetic disk or disk drive, coupled with said bus 101 for storing information and instructions, an alphanumeric input device 107 including alphanumeric and other keys coupled to said bus 101 for communicating information and command selections to said processor 102, a cursor control device 108, such as a mouse, track-ball, cursor control keys, etc., coupled to said bus 101 for communicating information and command selections to said processor 102 and for controlling cursor movement. Additionally, the system will typically include, one or more ports for receiving input signal data. Such ports are illustrated here as serial port 109 and parallel port 110.

The computer system 101 further includes a Local Area Network (LAN) adapter 111 for attaching to a LAN 112. The LAN Adapter 111 is coupled to CPU bus 101 and is used to transmit/receive information to/from the LAN 112. The LAN adapter is further described with reference to FIG. 2. In the currently preferred embodiment of the present invention, the LAN 112 is an Ethernet LAN.

It should be noted that the processor 102 will perform functions that are hereinafter referred to as Host functions. Such functions will become apparent in the description of that follows. Further, RAM 103 and data storage device 106 are used to handle and store the data packets to be transmitted to or received from the network.

Figure 2:
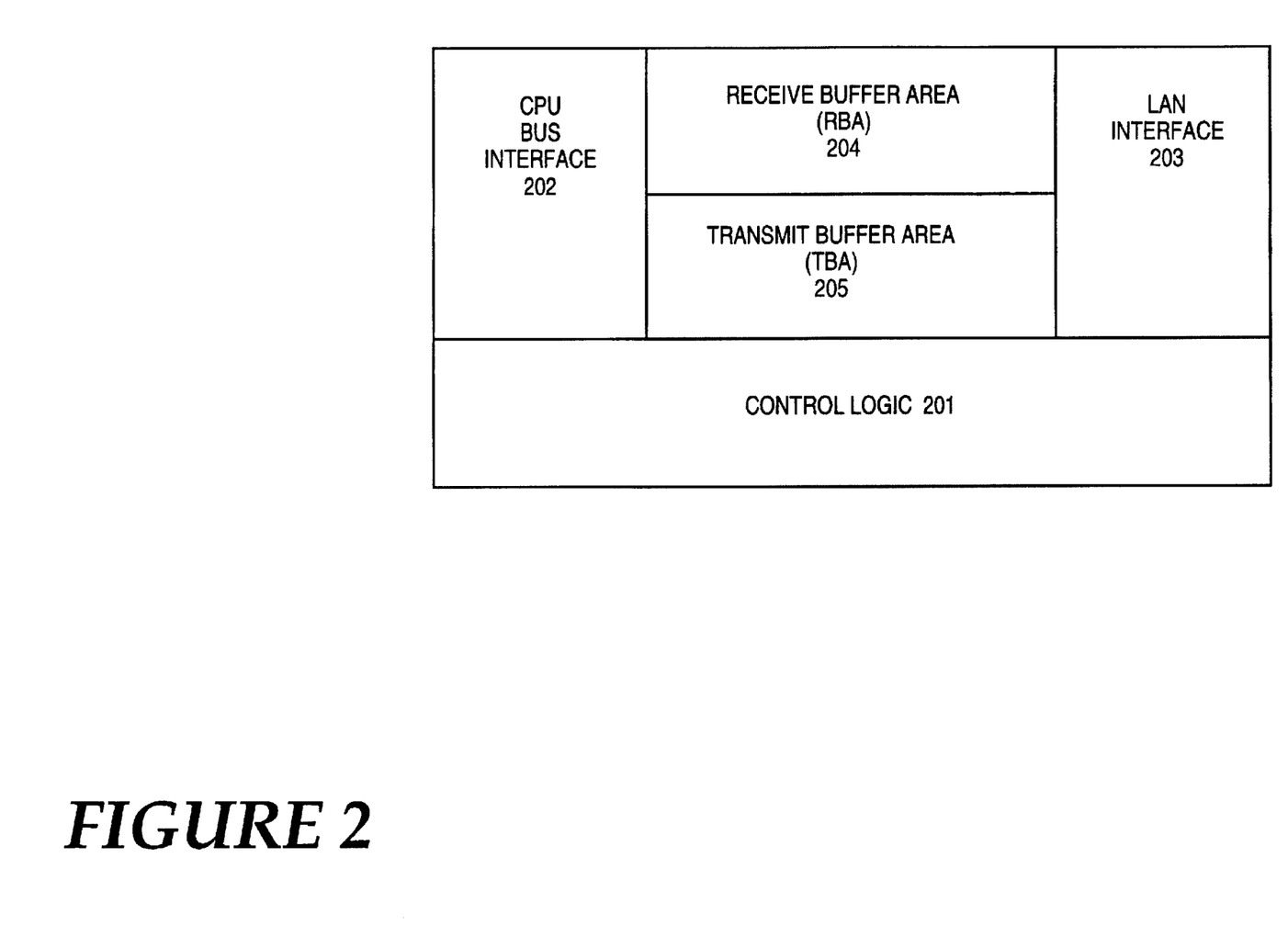
FIG. 2 is a block diagram illustrating the major functional components of a LAN adapter as may be utilized in the currently preferred embodiment of the present invention.

Referring to FIG. 2, the LAN adapter is controlled by control logic module 201. Typically, the control logic 201 may be part of an ASIC chip or a specifically designed integrated circuit chip. In any event, the control logic 201 controls the receipt, and transmittal of data to and from the LAN. A CPU bus interface 202 provides the physical interface to the processor via the processor bus. The LAN interface 203 provides the physical connections for interfacing to the LAN. A Receive Buffer Area (RBA) 204 is used to store data packets received from the network. The Transmit Buffer Area (TBA) 205 is used to store data that will be transmitted from the host processor to the network.

In known implementations, before a data packet may be transmitted or received, the entire packet must be in either the RBA 204, for receiving data, or the TBA 205, for transmitting data into the network. Clearly this does not make optimal use of either the computer system bus or the LAN. For example, if a large data packet is being received, the entire data packet must be received and stored in the receive buffer area prior to it being transmitted to the appropriate location on the computer system via the bus. If the receipt of the data from the network and the transfer of the data to the location in the computer system could be overlapped, an aggregate amount of time from when the data is first received by the computer system to the time at which it is stored on the computer system may be significantly reduced. Similarly, for the transmission of data into the network, the amount of time can be significantly reduced from the initiation of the transfer of data to when the data is actually on the network if the transfer time and the transmit time were overlapped. In both instances, the currently preferred embodiment of the present invention provides for such overlap.

The control logic module 201 in the LAN adapter will support early interrupt generation during packet reception. This means that the interrupt may occur any time after data is placed in the receive buffer. The present invention provides early interrupts to the Host (e.g. the processor 102 of FIG. 1) based upon certain events. These events are observed as buffer accesses into the Receive Buffer Area (RBA). In the currently preferred embodiment, the event monitored is the writing of data into the RBA. A counter counts the number of bytes written into the RBA. When a predetermined number of bytes have been written into the RBA (i.e. the threshold), the early receive interrupt is generated. The predetermined number of bytes would be generated by the host dependent on such facts as the Network Operating System and LAN topology being utilized.

In an alternative embodiment, the event monitored is the writing to a specific address in the RBA. In such an alternative embodiment, again the host would generate the specific addresses in the RBA to be monitored. Thus, in the alternative embodiment, early interrupts are generated when accesses to particular RBA address locations are detected. Preferably, in the alternative embodiment two independent, programmable interrupt trigger/threshold addresses are provided. Each trigger/threshold address may be either a receive data location, or a status/command location. Use of both provides flexibility across different frame types, packet sizes, etc..

The present invention may also monitor write accesses to the RBA. The result is a word count indicating the amount of data currently available for transfer by the host, even though packet reception may not be complete. To support this word count function, the driver must provide the start and end address of the memory area to be monitored (i.e., the current portion of the RBA). The word count is incremented by one when the communications resource writes to the area delimited by these boundaries. If the packet size is an odd number of bytes, the last data write will actually be a single byte, and this final count will exceed the true count by one. Thus this count is intended for use only while moving early data. A separate count field is referred to upon completion of the entire data packet.

Figure 1:
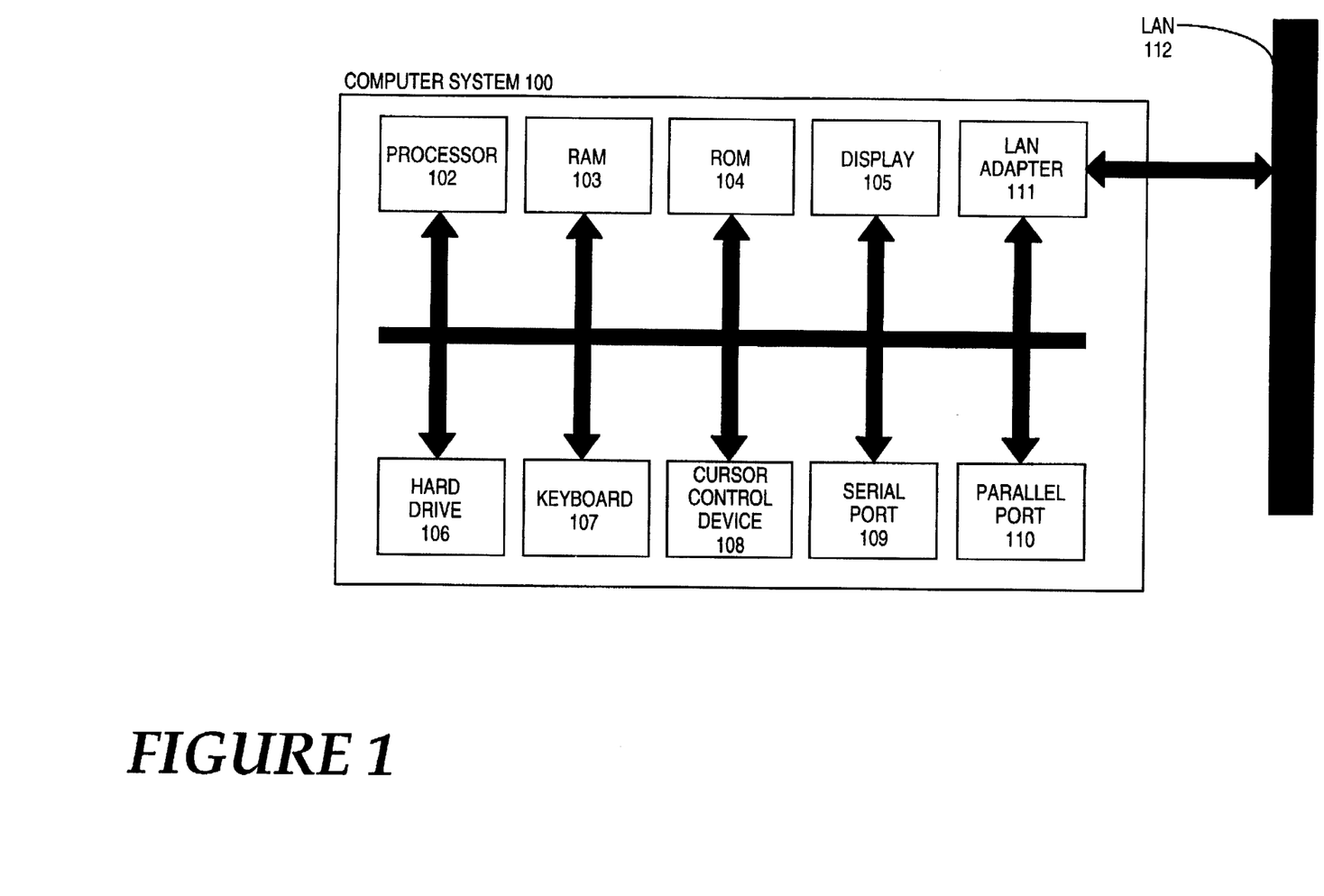
FIG. 1 is a block diagram of the components of a computer system with a Local Area Network (LAN) adapter coupled to a LAN as may be implemented in the currently preferred embodiment of the present invention.

In case of packet transmission, a performance increase may be realized by setting the communications resource transmit command active before the entire packet has been downloaded to the buffer from system memory (e.g. RAM 103 of FIG. 1). Unfortunately, this model has the potential for failure if the system is unable to stay ahead of the communications resource in the use of the transmit data buffer. If this were to happen, the communications resource would read the incorrect data, append a valid CRC, and give no indication of an error.

Although the host interface is faster than the communications resource requirements, the driver could fall behind if it is interrupted or if bus master devices consume excessive bus bandwidth. While it is possible to disable interrupts during this period, it is not possible for the driver to prevent bus masters from acquiring the bus. In addition, disabling interrupts for a long period of time may have an adverse effect on other interrupt driven devices, such as serial port modems. The most compatible approach is to leave interrupts enabled and provide a mechanism for detecting an underrun condition.

The communications resource can detect the underrun condition when the Host write pointer equals the communications address resource. Detection may be controlled by an enable flag which must be set by the host before attempting the early transmit, and cleared by the host when complete. When an underrun is detected, the communications resource will set an error flag to set in motion the creation of an erred packet (which is described in greater detail below).

The transmit routine may read the error flag after moving each block, or after moving the entire packet. If an underrun occurred, the driver need only reissue the transmit command, because there will have been no corruption of the transmit buffer.

A more detailed description of the procedures for early receipt and early transmittal now follow.

Early Receive

Figure 3A:
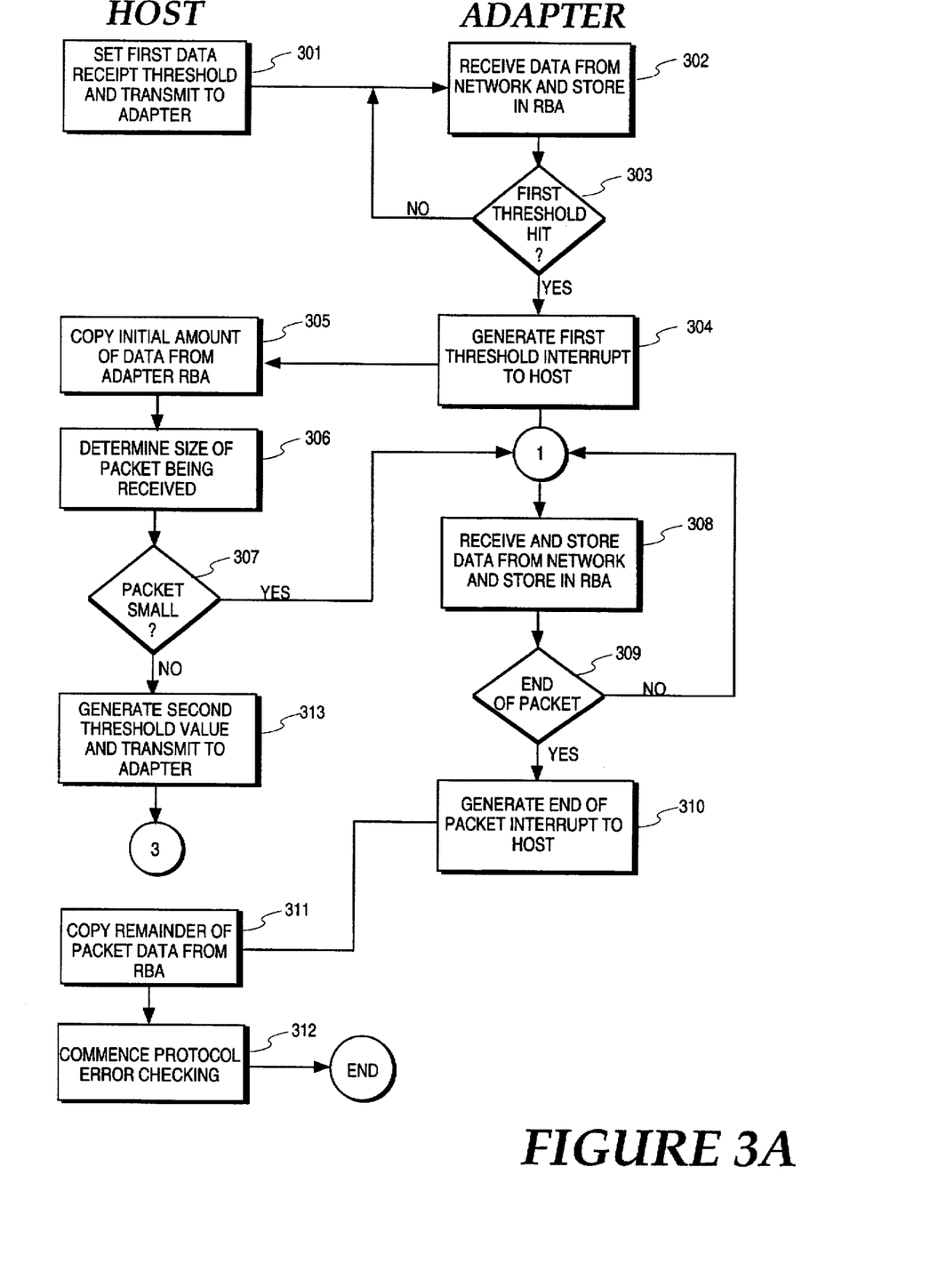
FIGS. 3a and 3b are flow charts which illustrate the steps performed by the host processor and the adapter for early receipt of data as been performed in the currently preferred embodiment of the present invention.
Figure 3B:
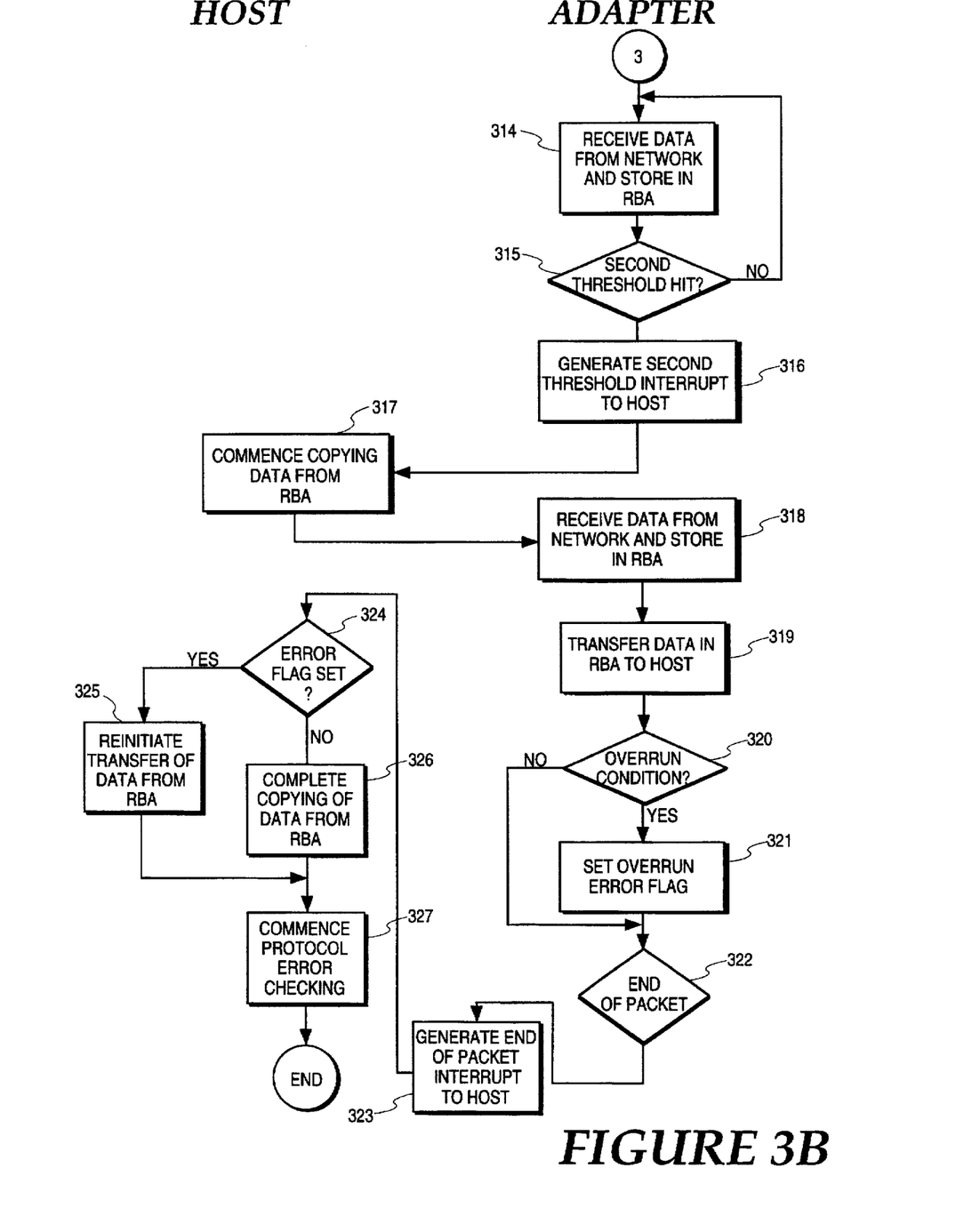

FIGS. 3a and 3b are flowcharts which illustrate the step performed by the host processor and the adapter for early receipt of a data packet. First, the host sets a first receive threshold and transmits this value to the adapter, step 301. The first data receive threshold is typically a number of bytes comprising the packet header information. The value of the first data threshold is dependent on such factors as the Network Operating System being used as well as the physical LAN implementation. For example, in the 802.3 format, the header information will be received in the first fourteen (14) bytes. So by setting the first data threshold to 14 bytes it can assured that the packet header is within the Receive Buffer Area (RBA) of the LAN Adapter. Typically, this data is sent to the adapter once and retrieved for later use. In any event, the adapter will then receive data from the network and store it in the RBA, step 302. During the receive and store process a check is made to determine whether or not the first threshold is hit, step 303. When the first threshold is hit, a first threshold interrupt is generated and transmitted to the host processor, step 304. When the host processor receives this interrupt it processes it by transferring this initial amount of data from the RBA, step 305. As noted above this information will comprise the packet header. The size of the packet is then determined, step 306. The packet will typically contain the packet size as well as certain addressing information. At this point, the packet size information is examined. A check is then made to determine whether the packet is small, step 307. If the packet is small, e.g. sixty-four (64) bytes, it may not be worthwhile to try and receive data early. If the packet is small, the host processor may allow the entire data packet to be received, before transferring any of the data. Thus, the adapter will receive and store data into the RBA from the network, step 308 and check for the end of the packet, step 309. So long that it is not at the end of the packet the adapter will continue the receiving and storing of data. When all the data in the packet is received an end of packet interrupt is generated, step 310. When the end of pack interrupt is received by the host, it will copy the remainder of the packet data from the RBA, step 311. Once the entire data packet is received by the host it will commence protocol error checking, step 312. This step is comprised of the normal processing for the protocol being used.

Assuming now that the packet is not small, a second threshold value is generated and transmitted to the adapter step, 313. As noted above, in the preferred embodiment the second threshold value is a predetermined byte count and in an alternative embodiment it is a specific address in the RBA. Referring now to FIG. 3b, the adapter will again continue to receive data from the network and store the received data in the RBA, step 314, until the second threshold is hit, step 315. When the second threshold is hit a second threshold interrupt is generated and transmitted to the host, step 316. When the second threshold interrupt is received by the host it will commence copying data from the RBA, step 317. Concurrent with the transfer of data from the adapter, the adapter will receive and store data from the network, step 318 and transfer that data to the host, step 319. During the receipt and storing of data from the network and transferring from the data to the host, overrun conditions are checked for, step 320. An overrun condition will occur when the data which is being transferred from the adapter receive buffer memory to the host exceeds the data being received from the network. Irrespective of an overrun condition being detected, the processing and receipt of data will commence until the end of packet is reached, step 322. This is to insure that the receipt of the entire data packet occurs into the RBA. When the end of packet is received an end of packet interrupt is generated and transferred into the host, step 323. When the end of packet interrupt is received by the host, a check is made to determine whether or not the error flag is set, step 324. If the error flag has been set, the host will reinitiate transfer of the data from the RBA, step 325. In this case, all the data will have to be transferred. If the error flag is not set, the remainder of the data in the RBA is transferred, step 326. In either circumstance, once the data has been received from the RBA, the protocol error checking is performed, step 327.

Figure 5A:
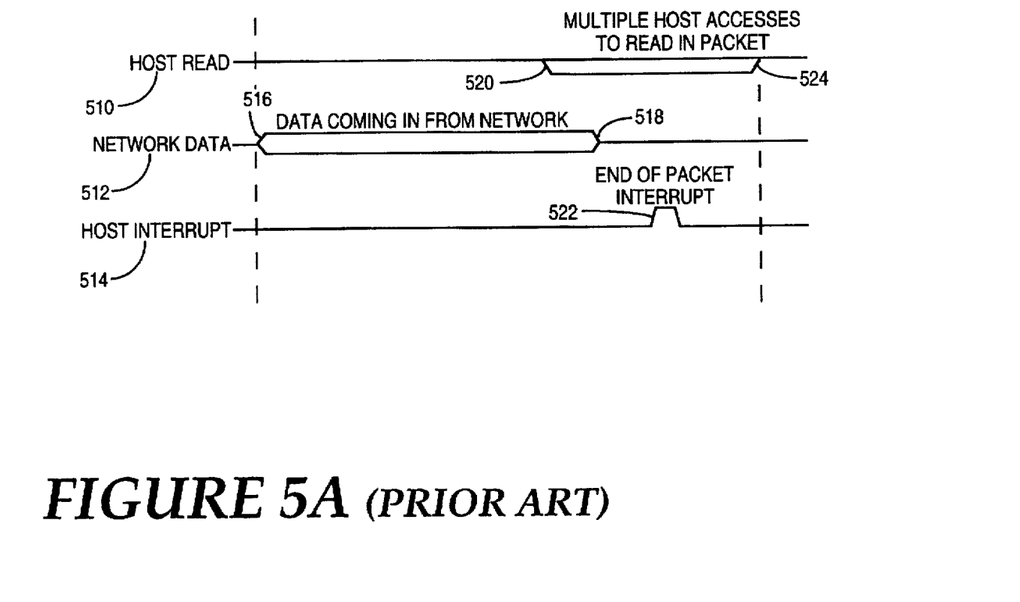
FIG. 5A is a timing diagram illustrating the receipt of data in a typical prior art system.

Referring to FIG. 5A, a timing diagram illustrates the receipt of data in a typical prior art system. As indicated in FIG. 5A, network data is received between timing edges 516 and 518. Subsequent to the receipt of network data, an end of packet interrupt 522 occurs and the host computer begins to read in the data packet at edge 520. Note that the reception of data from the network and the reading of the data by the host computer is performed serially in the prior art.

Figure 5B:
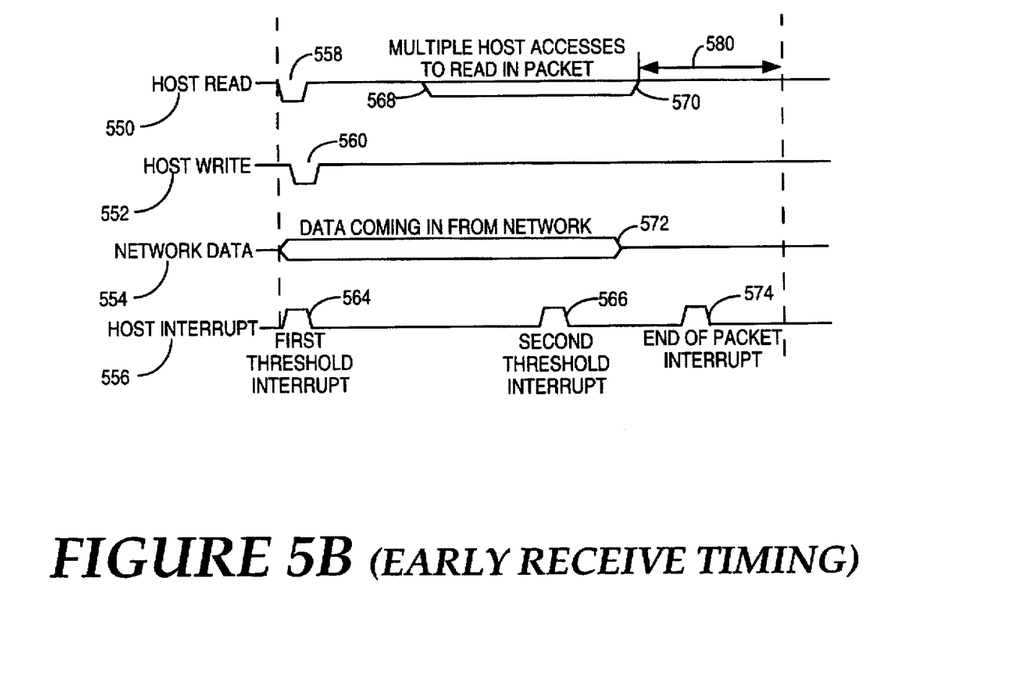
FIG. 5B is a timing diagram illustrating the early receipt of data as may be performed in the currently preferred embodiment of the present invention.

Referring now to FIG. 5B, a timing diagram of the early data receive process of the present invention is illustrated. In the present invention, while network data 554 is being received from the network, a second threshold interrupt 566 occurs. At this point, the host computer begins to read data at edge 568. The host data read occurs concurrently with data coming in from the network. Thus, once the host completes the data read at edge 570, the present invention has realized a decrease in the amount of time required to receive data in comparison to prior art systems as indicated by line 580 in FIG. 5B.

Early Transmittal

Figure 4:
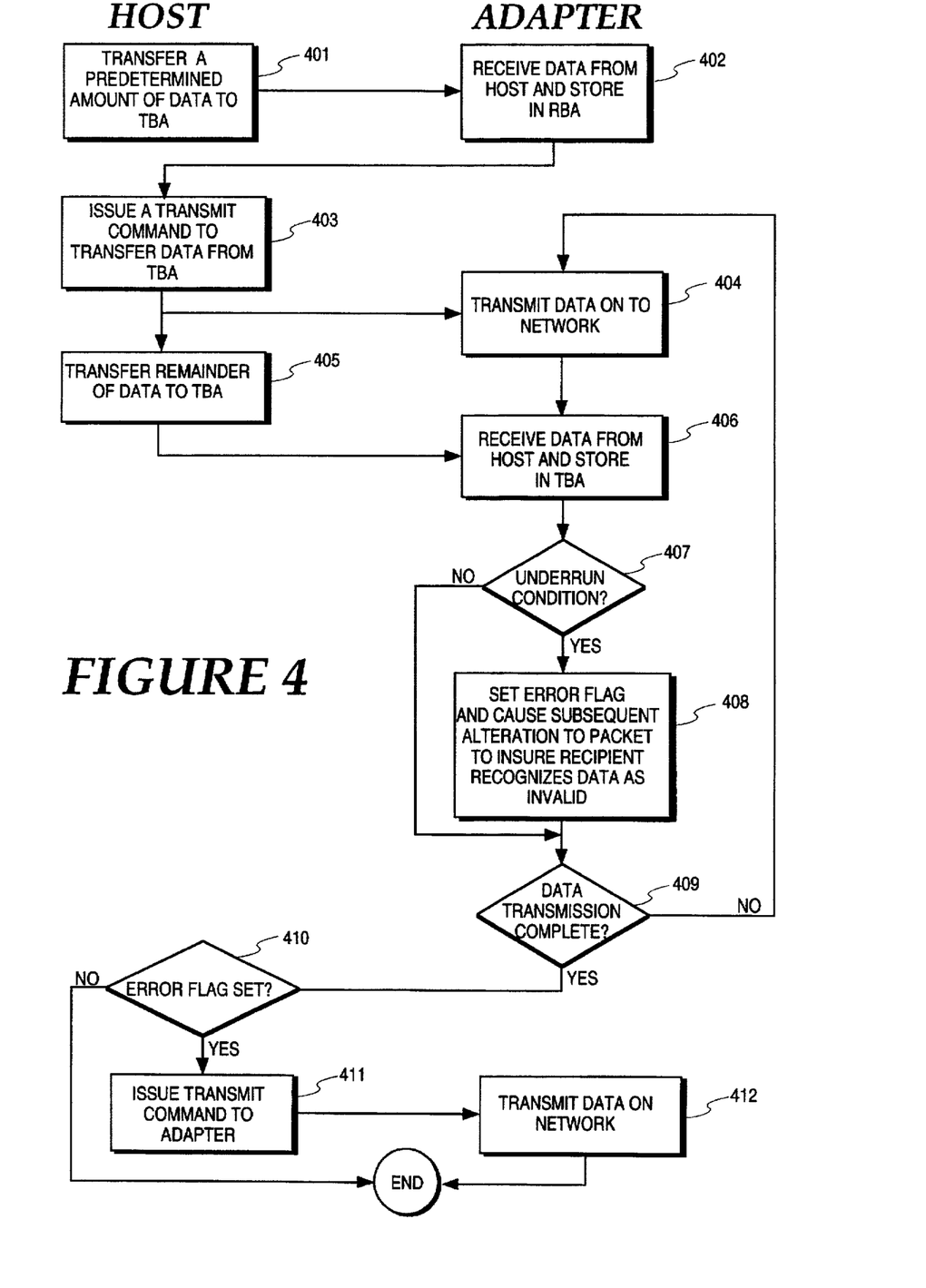
FIG. 4 is a flowchart illustrating the steps performed by the host and the adapter for early transmittal of a data packet in the currently preferred embodiment of the present invention.

FIG. 4 is a flowchart describing the steps performed by the host and the adapter for the early transmission of data. Referring to FIG. 4, first a predetermined amount of data is transferred from the host to the Transmit Buffer Area (TBA) of the LAN adapter, step 401. Typically, this predetermined amount of data will include the packet header plus some other predetermined number of bytes. Next, the adapter will receive and store the data from the host in the TBA, step 402. The host processor will then issue a transmit command to transfer the data from the TBA in the LAN adapter to a desired location within the network, step 403. Thereafter, a transfer command will be issued by the host to transfer the remainder of the data to the TBA of the adapter, step 404. Concurrently therewith data is transmitted onto the network by the adapter, step 405, and data is received from the host and stored in the TBA, step 406. During this transfer and transmittal of data, an underrun condition is checked for, step 407. An underrun condition will exist if the data being transmitted on to the network is not "behind" the data being transferred from the host to the adapter TBA. This will occur when the address of the adapter TBA that is accessed to transmit data to the network exceeds the address to which data is being transferred to the TBA. If an underrun condition exists, an error flag is set and the adapter is set-up to cause subsequent packet alteration to insure the recipient knows the transmitted data is invalid, step 408. The packet being transmitted will further be altered to insure that the data packet transmission will be recognized by a recipient as containing errors. The manner in which the packet is altered to indicate invalid data is dependent on the transmission protocol being utilized. For example in the 802.5 CSMA/CD protocol the encoded CRC field will cause the recipient to invalidate the packet. In any event, whether or not an underrun condition exists the data is transferred to the TBA until the data transmission is completed, step 409. When the data transmission is complete, the host will check to determine whether or not the error flag had been set, step 410. If the error flag has been set the host will issue a transmit command to retransmit the data in the TBA. At this point the adapter data would then transmit the data onto the network. If the error flag was not set than the host processor will recognize that the transmission was without error as a result of early transmittal.

Figure 6A:
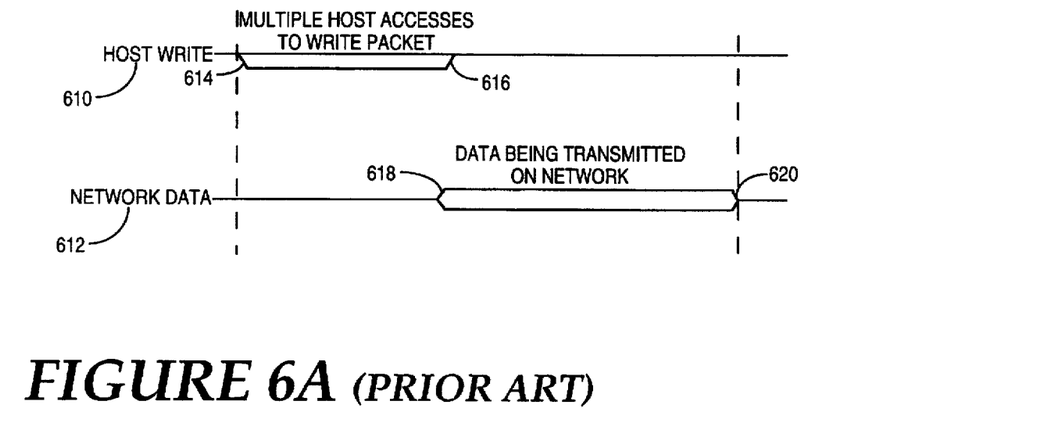
FIG. 6A is a timing diagram illustrating the transmittal of a data packet in a typical prior art system.

FIG. 6A is a timing diagram illustrating the transmittal of a data packet in a typical prior art system. In a typical prior art implementation, a host computer writes data to a buffer between timing edges 614 and 616. Subsequently, data is transmitted from the buffer on the network between edges 618 and 620. Note that the host write and network transmission operations occur serially in the prior art.

Figure 6B:
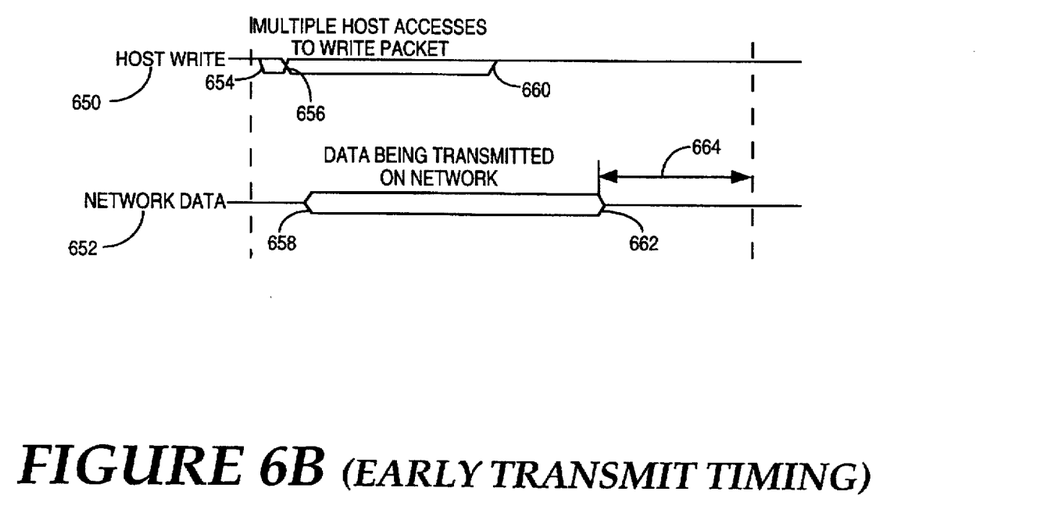
FIG. 6B is a timing diagram illustrating the timing sequence for the early transmittal of a data packet in the currently preferred embodiment of the present invention.

Referring now to FIG. 6B, a timing diagram illustrates the timing sequence for the early transmittal of data in the preferred embodiment of the present invention. As shown in FIG. 6B, the host processor issues a transmit command during timing edges 654 and 656. Subsequently, the host processor writes a data packet between edges 656 and 660 while data is transmitted on the network between timing edges 658 and 662. The host write of the data packet occurs concurrently with the data being transmitted on the network. Thus, the present invention realizes a decrease in the transmit time required for transmitting data over the network in relation to the prior art. This decrease in the transmit time is indicated in FIG. 6B by Line 664.

Thus, a Buffer Memory Management Module for a Computer Network Node which provides for early receipt and transmittal of packets, is disclosed.

We claim:

1. A method for receiving a data packet from a network and transferring the data packet to a host, comprising the steps of:

(a) receiving a first number of bytes of said data packet in a data packet buffer;

(b) determining the size of the data packet;

(c) allowing all of the data packet to be received in the data packet buffer, the entire packet to be transferred to the host, if said size of said data packet is less than a small packet threshold indicating a first threshold value;

(d) transferring a portion of said data packet from said data packet buffer to the host prior to the receipt of said entire data packet into said data packet buffer if said size of said data packet is greater than said first threshold value, but less than a second number of bytes indicating a second threshold value;

(e) sending a receive packet interrupt signal from said data packet buffer to the host when said first threshold value is hit or said second threshold value is hit;

(f) determining if said data being transferred to said host is valid or invalid;

(g) detecting that said data packet being transferred from said data packet buffer to said host contains invalid data setting an error flag; and (h) detecting when said error flag is set and issuing a command to said system to request a retransfer of said data packet.

2. The method as recited in claim 1 wherein said step of determining if the data being transferred to the host is valid or invalid is further comprised of the steps of:

comparing a first address of said data packet buffer where data is being received with a second address of said data packet buffer from which data is being transferred to the host;

if said second address does not exceed an address range where the data packet has been received, said address range defined by said first address, identifying said data being transferred as valid; and if said second address exceeds said address range where the data packet has been received, identifying said data being transferred as invalid.

3. A computer system for communication with a network comprising:

a host;

a data packet buffer that receives a data packet from the network, wherein said data packet has a first number of bytes;

logic for determining the size of said data packet;

logic for allowing all of said data packet to be received in said data packet buffer, the entire packet to be transferred to the host, if said size of said data packet is less than a small packet threshold indicating a first threshold value;

packet transmitting logic for transmitting a portion of said data packet from said data packet buffer to the host prior to the receipt of said entire data packet into said data packet buffer if said size of said data packet is greater than said first threshold value, but less than a second number of bytes indicating a second threshold value;

interrupt generating logic for sending a receive packet interrupt signal to the host when said first threshold value is hit or said second threshold value is hit;

error detecting logic for detecting that said data packet being transferred from said data packet buffer to said host contains invalid data setting an error flag; and error handling logic for detecting when said error flag is set and issuing a command to said system to request a retransfer of said data packet.

4. The circuit as recited in claim 3 wherein said error detecting logic comprises a comparator for comparing a first address where data is being received by said data packet buffer and a second address where data is being transferred from said data packet buffer to the network.

* * * * *